United States Patent
Lim

(10) Patent No.: US 9,490,467 B2
(45) Date of Patent: Nov. 8, 2016

(54) BATTERY PACK

(75) Inventor: Young-Bin Lim, Yongin-si (KR)

(73) Assignees: Samsung SDI Co., Ltd., Yongin-si (KR); Robert Bosch GmbH, Stuttgart (DE)

(*) Notice: Subject to any disclaimer, the term of this patent is extended or adjusted under 35 U.S.C. 154(b) by 872 days.

(21) Appl. No.: 13/116,987

(22) Filed: May 26, 2011

(65) Prior Publication Data

US 2012/0194004 A1 Aug. 2, 2012

(30) Foreign Application Priority Data

Jan. 31, 2011 (KR) .................. 10-2011-0009514

(51) Int. Cl.
| | |
|---|---|
| H01H 47/00 | (2006.01) |
| H01M 2/34 | (2006.01) |
| B60L 3/00 | (2006.01) |
| B60L 11/18 | (2006.01) |
| H01M 10/48 | (2006.01) |

(52) U.S. Cl.
CPC .............. *H01M 2/34* (2013.01); *B60L 3/0007* (2013.01); *B60L 3/0046* (2013.01); *B60L 11/1853* (2013.01); *B60L 11/1879* (2013.01); *H01M 10/482* (2013.01); *H01M 2200/00* (2013.01); *H01M 2220/20* (2013.01); *Y02T 10/705* (2013.01); *Y02T 10/7005* (2013.01); *Y10T 307/826* (2015.04)

(58) Field of Classification Search
USPC ........................................................ 307/125
See application file for complete search history.

(56) References Cited

U.S. PATENT DOCUMENTS

| | | | |
|---|---|---|---|
| 5,238,083 A | 8/1993 | Horie et al. | |
| 6,417,579 B1 | 7/2002 | Lehnst et al. | |
| 8,258,651 B2 * | 9/2012 | Duan | H02J 7/0031 307/10.7 |
| 9,211,800 B2 * | 12/2015 | Nishi | H02J 7/0016 |
| 2002/0084636 A1 * | 7/2002 | Lewallen | B60R 21/01564 280/735 |
| 2005/0184495 A1 * | 8/2005 | Zerbe | B60L 3/0046 280/735 |
| 2007/0139007 A1 * | 6/2007 | Lim | G01R 31/3658 320/116 |
| 2007/0152432 A1 * | 7/2007 | Uchida | B60K 28/14 280/735 |

(Continued)

FOREIGN PATENT DOCUMENTS

| | | |
|---|---|---|
| DE | 4234551 C1 | 1/1994 |
| EP | 2 400 628 A2 | 12/2011 |

(Continued)

OTHER PUBLICATIONS

JPO Office action dated Apr. 2, 2013, for corresponding Japanese Patent application 2011-092912, (3 pages).

(Continued)

*Primary Examiner* — Rexford Barnie
*Assistant Examiner* — Daniel Kessie
(74) *Attorney, Agent, or Firm* — Lewis Roca Rothgerber Christie LLP

(57) ABSTRACT

A battery pack including a plurality of battery modules including a plurality of battery cells; a plurality of relays connected to output lines of the plurality of battery modules and at least one connection line between battery modules of the plurality of battery modules; a battery control unit connected to the plurality of relays for controlling the plurality of battery cells; and at least one sensor connected to the battery control unit and configured to output a signal to the battery control unit, and the battery control unit is configured to control the plurality of relays in response to the signal outputted from the at least one sensor.

7 Claims, 5 Drawing Sheets

(56) References Cited

U.S. PATENT DOCUMENTS

| | | | |
|---|---|---|---|
| 2007/0291425 A1 | 12/2007 | Yugou | |
| 2008/0086250 A1* | 4/2008 | Kuivenhoven | B60R 21/0173 701/45 |
| 2008/0236999 A1 | 10/2008 | Kahnert | |
| 2009/0079434 A1 | 3/2009 | Osawa et al. | |
| 2009/0096286 A1* | 4/2009 | Buck | B60L 3/04 307/10.7 |
| 2010/0127663 A1* | 5/2010 | Furukawa | B60L 3/0046 320/134 |
| 2010/0134068 A1* | 6/2010 | Lim | H02J 7/0016 320/116 |
| 2010/0264878 A1* | 10/2010 | Ueda | H02J 7/0016 320/116 |
| 2010/0305792 A1 | 12/2010 | Wilk et al. | |
| 2011/0074354 A1* | 3/2011 | Yano | H01M 10/441 320/116 |
| 2011/0128662 A1* | 6/2011 | Kato | B60L 3/0069 361/166 |
| 2012/0081068 A1 | 4/2012 | Odaohhara et al. | |
| 2012/0091964 A1* | 4/2012 | Vance | B60L 3/0046 320/122 |
| 2012/0194004 A1 | 8/2012 | Lim | |
| 2012/0194139 A1 | 8/2012 | Sasaki et al. | |
| 2012/0327562 A1 | 12/2012 | Hara et al. | |

FOREIGN PATENT DOCUMENTS

| | | |
|---|---|---|
| EP | 2 482 367 A2 | 8/2012 |
| EP | 2 482 375 A1 | 8/2012 |
| JP | 04-208007 | 7/1992 |
| JP | 06-234342 | 8/1994 |
| JP | 2002-531310 | 9/2002 |
| JP | 2003-165406 | 6/2003 |
| JP | 2004-146307 A | 5/2004 |
| JP | 2004-152706 A | 5/2004 |
| JP | 2004-311290 | 11/2004 |
| JP | 2006-340577 A | 12/2006 |
| JP | 2007-331606 | 12/2007 |
| JP | 2008-091183 A | 4/2008 |
| JP | 2009-081964 | 4/2009 |
| JP | 2009-158219 | 7/2009 |
| JP | 2009-194980 A | 8/2009 |
| JP | 2009-224262 | 10/2009 |
| JP | 2010-003619 A | 1/2010 |
| JP | 2010-123517 A | 6/2010 |
| JP | 2010-252592 | 11/2010 |
| JP | 2010-264830 A | 11/2010 |
| JP | 2012-156025 | 8/2012 |
| KR | 1997-0051619 | 7/1997 |
| KR | U20-1998-0013529 A | 6/1998 |
| KR | 10-1998-0049720 | 9/1998 |
| KR | 10 0211570 B1 | 5/1999 |
| KR | 10-2006-0083684 A | 7/2006 |
| KR | 10 2006 0102667 A | 9/2006 |
| KR | 10 2007 0093753 A | 9/2007 |
| KR | 10-2012-0010377 | 2/2012 |
| WO | WO 2011/042807 * | 8/2010 |
| WO | WO 2010/138744 A2 | 12/2010 |
| WO | WO 2011/042807 A1 | 4/2011 |

OTHER PUBLICATIONS

EPO Office action dated May 3, 2012 issued in European Patent Application No. 11176046.8, which claims priority to corresponding Korean priority application No. 10-2011-0009514, 7 pages.

Korean Office action dated May 1, 2012 issued in Korean priority application No. 10-2011-0009514, 4 pages.

EPO Office action dated Jun. 6, 2013, for corresponding European Patent application 11176046.8, (7 pages).

European Office Action, for Application No. 11176046.8, dated Sep. 27, 2012, 18 pages.

JPO Office action dated Sep. 17, 2013, for corresponding Japanese Patent application 2011-092912, (2 pages).

Notice of Allowance for corresponding Korean Patent Application No. 10-2011-0009514, dated Nov. 1, 2012 (1 sheet).

Office Action for corresponding Japanese Patent Application No. 2011-092912, dated Nov. 13, 2012 (5 sheets).

U.S. Office action dated Jan. 15, 2015, for cross reference U.S. Appl. No. 13/760,865, (11 pages).

Korean Patent Abstracts for Korean Patent 10-0164337 dated Sep. 11, 1998, corresponding to Korean Publication 1997-0051619 dated Jul. 29, 1997, listed above, (1 page).

EPO Search Report dated Nov. 21, 2013, corresponding to European Patent application 13164583.0, (6 pages).

JP Office action dated Mar. 18, 2016 for JP Application No. 2012-136658, 5 pages.

U.S. Office action dated Jul. 30, 2015, for cross reference U.S. Appl. No. 13/760,865, (13 pages).

Notice of Allowance dated Nov. 27, 2015 for cross-reference U.S. Appl. No. 13/760,865 (8 pgs.).

* cited by examiner

BATTERY PACK

CROSS-REFERENCE TO RELATED APPLICATION

This application claims priority to and the benefit of Korean Patent Application No. 10-2011-0009514, filed on Jan. 31, 2011 in the Korean Intellectual Property Office, the entire content of which is incorporated herein by reference.

BACKGROUND

1. Field

Aspects of embodiments of the present invention relate to a battery pack, and more particularly, to a battery pack having improved safety.

2. Description of the Related Art

In general, battery cells are used as energy sources for mobile devices, electric vehicles, hybrid vehicles, and the like. The shape of the battery cell may be varied depending on the kind of external device to which the battery cell is applied.

A small-sized mobile device such as a cellular phone can be operated with the power and capacity of a single battery cell for a certain period of time. However, in a case where long-time driving and high-power driving are necessary for an electric vehicle, hybrid vehicle, or the like, which has large power consumption, a large-capacity battery module is configured by electrically connecting a plurality of battery cells so as to increase power and capacity. The battery module increases output voltage or current according to the number of battery cells built therein.

A battery pack may be configured by electrically connecting a plurality of battery modules. In this instance, the battery pack is provided with a battery control unit operated to control the state of each battery cell, and a relay operated to cut off current in response to a signal from the battery control unit.

SUMMARY

According to an aspect of embodiments of the present invention, a battery pack is configured such that when it is determined that the battery pack is damaged from an airbag impact, moisture, or impact sensor, a battery control unit transfers the sensed signal to sub-relays positioned between battery modules, so that it is possible to cut off electrical connection between the battery modules.

According to another aspect of embodiments of the present invention, a battery pack having an interlock circuit or separate circuit added to the battery pack, such that when it is necessary to repair the battery pack, sub-relays positioned between battery modules are operated, thereby cutting off electrical connection between the battery modules.

According to an embodiment of the present invention, a battery pack includes: a plurality of battery modules including a plurality of battery cells; a plurality of relays connected to output lines of the plurality of battery modules and at least one connection line between battery modules of the plurality of battery modules; a battery control unit connected to the plurality of relays for controlling the plurality of battery cells; and at least one sensor connected to the battery control unit and configured to output a signal to the battery control unit, and the battery control unit is configured to control the plurality of relays in response to the signal outputted from the at least one sensor.

When at least one relay of the plurality of relays receives a signal from the battery control unit, the at least one relay cuts off electrical connection between the battery modules.

The at least one sensor may include at least one of an airbag impact sensor, a moisture sensor, or an impact sensor.

The battery pack may further include an airbag control unit connected between the airbag impact sensor and the battery control unit.

A signal outputted from the airbag impact sensor may be simultaneously transferred to the battery control unit and the airbag control unit.

The signal outputted from the airbag impact sensor may be transferred to the battery control unit through the airbag control unit.

The plurality of relays may include main-relays connected to the output lines of the battery modules and at least one sub-relay connected to the at least one connection line between the battery modules.

The main-relays and the at least one sub-relay may be operated simultaneously or individually.

The battery pack may further include an interlock circuit connected to the battery control unit, the interlock circuit being configured to selectively control the relays for repairing the battery pack.

According to another aspect of embodiments of the present invention, if the insulation of a battery pack is broken due to impact or water intrusion, or if otherwise necessary, the output voltage of the battery pack is decreased to the voltage level of any one battery module, so that the risk of fire, electric shock, or the like can be reduced, thereby improving safety of the battery pack.

BRIEF DESCRIPTION OF THE DRAWINGS

The accompanying drawings, together with the specification, illustrate some exemplary embodiments of the present invention, and, together with the description, serve to explain the principles of the present invention.

DETAILED DESCRIPTION

In the following detailed description, some exemplary embodiments of the present invention have been shown and described by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements FIG. 1 is a perspective view showing a battery pack according to an embodiment of the present invention.

Figure 1:
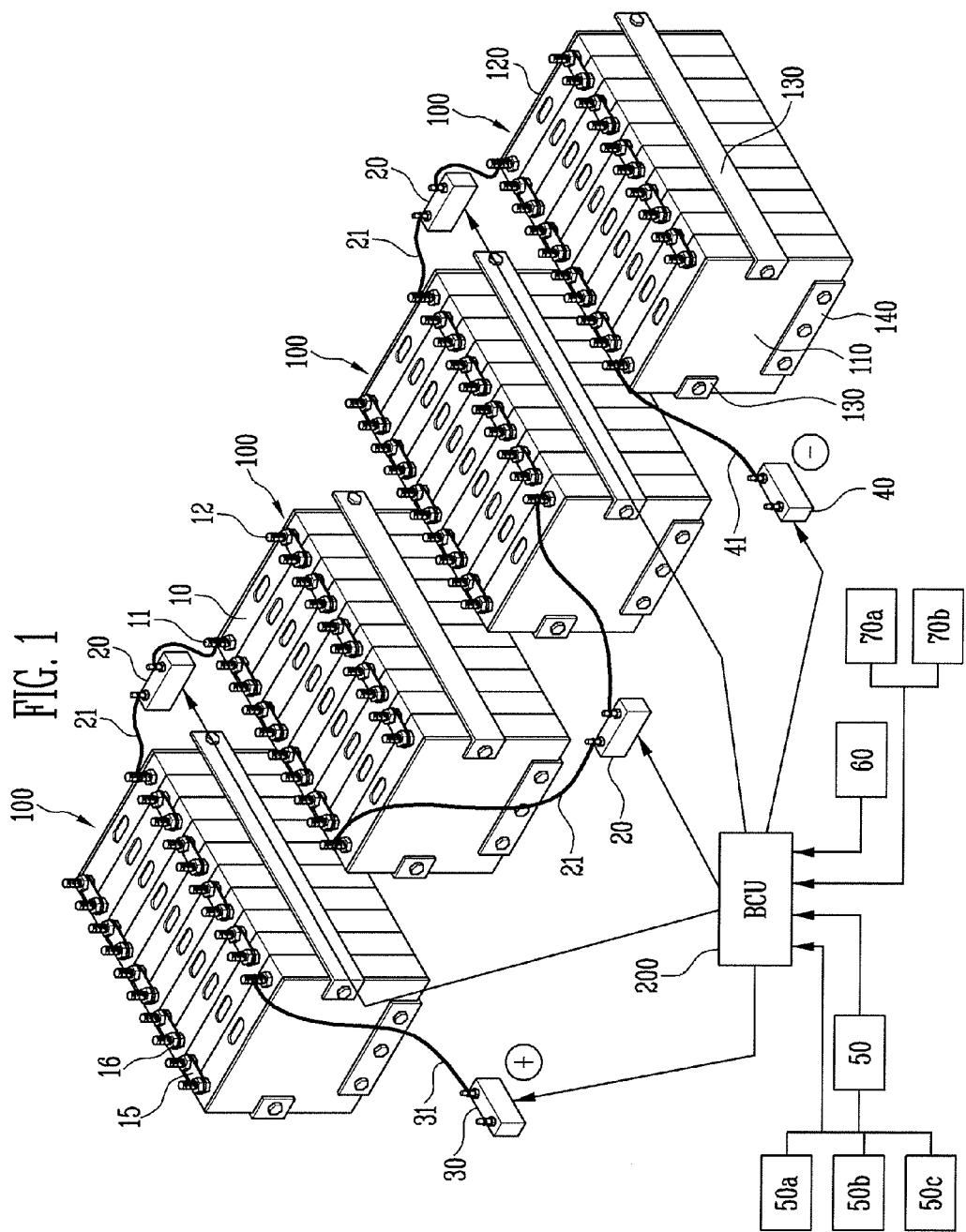
FIG. 1 is a perspective view showing a battery pack according to an embodiment of the present invention.

Referring to FIG. 1, the battery pack according to an embodiment of the present invention includes at least one battery module 100, a plurality of relays 20, 30, and 40, a battery control unit (BCU) 200, and one or more sensors 50a, 50b, 50c, 60, 70a, and 70b.

The battery module 100, in one embodiment, is a high-voltage and large-capacity battery module, and has a structure in which a plurality of battery cells 10 are aligned in one direction at intervals. The battery cells 10 may be formed in various shapes. However, one embodiment in which the battery cell 10 is formed in a prismatic shape will be described herein for purposes of illustration.

The battery cell 10, in one embodiment, has a general structure including an electrode assembly in which positive and negative electrode plates are respectively disposed at both sides of a separator interposed therebetween so as to charge/discharge a predetermined amount of power. Positive and negative electrode terminals 11 and 12 are protruded from the top of each of the battery cells 10 while maintaining a predetermined interval. In one embodiment, each of the positive and negative electrode terminals 11 and 12 is formed having the shape of a bolt with a screw thread formed on an outer circumferential surface thereof.

The positive and negative electrode terminals 11 and 12 of any one battery cell 10 may be arranged to correspond to the positive and negative electrode terminals 11 and 12 of another battery cell 10, respectively. Accordingly, in one embodiment, the positive electrode terminal 11 of any one battery cell 10 and the negative electrode terminal 12 of the another battery cell 10 adjacent to the one battery cell 10 are respectively inserted into holes of a bus-bar 15 and then fastened to the bus-bar 15 by nuts 16.

The positive and negative electrode terminals 11 and 12 of the battery cells 10 are fastened to the bus-bars 15 such that it is possible to configure the battery module 100 in which the battery cells 10 are electrically connected to one another. In the battery module 100, the battery cells 10 may be connected in series to one another by repeating the fastening structure of the electrode terminals 11 and 12 and the bus-bars 15.

As shown in FIG. 1, a plurality of battery modules 100 are electrically connected to one another, and sub-relays 20 may be provided between the respective battery modules 100. The sub-relays 20 may be connected to connection lines 21 between adjacent battery modules 100. That is, the positive or negative electrode terminal 11 or 12 provided to the battery cell 10 of any one battery module 100 and the negative or positive electrode 12 or 11 provided to the battery cell 10 of another battery module 100 are electrically connected to each other through the sub-relay 20.

Positive and negative electrode main-relays 30 and 40 may be connected to output lines 31 and 41 of the battery modules 100 positioned at respective ends among the plurality of battery modules 10.

The sub-relays 20, the positive electrode main-relay 30 and the negative electrode main-relay 40 may be electrically connected to the BCU 200. Thus, the sub-relays 20, the positive electrode main-relay 30, and the negative electrode main-relay 40 can be controlled and operated in response to a signal from the BCU 200. Particularly, the sub-relays 20 can cut off electrical connection between the respective adjacent battery modules 100. In one embodiment, a signal may be transferred to the BCU 200 by one or more of the sensors 50a, 50b, 50c, 60, 70a, and 70b.

In one embodiment, the sensors 50a, 50b, 50c, 60, 70a, and 70b may include airbag impact sensors 50a, 50b, and 50c, impact sensors 70a and 70b, and a moisture sensor 60, for example. Accordingly, the BCU 200 can receive a signal outputted from the sensors 50a, 50b, 50c, 60, 70a, and 70b and transfer the received signal to the sub-relays 20, the positive electrode main-relay 30, and the negative electrode main-relay 40.

In one embodiment, the battery pack may further include an airbag control unit 50 between the BCU 200 and the airbag impact sensors 50a, 50b, and 50c. Accordingly, a signal outputted from the airbag impact sensors 50a, 50b, and 50c may be simultaneously transferred to the BCU 200 and the airbag control unit 50. Alternatively, a signal outputted from the airbag impact sensors 50a, 50b, and 50c may be transferred to the BCU 200 through the airbag control unit 50.

The sub-relays 20, the positive electrode main-relay 30, and the negative electrode main-relay 40 may be simultaneously or individually operated. Accordingly, the BCU 200 can individually control the sub-relays 20, the positive electrode main-relay 30, and the negative electrode main-relay 40 in response to a signal outputted from the airbag impact sensors 50a, 50b, 50c, the impact sensor 70a and 70b, or the moisture sensor 60.

Since, in one embodiment, a few tens of battery cells 10 may be connected in the battery pack, the BCU 200 is necessary to control the state of each of the battery cells 10. In a case where the battery pack is charged, the battery cells 10 may be charged and discharged to different energy levels while being repeatedly charged and discharged several times. If the plurality of battery cells 10 are discharged to different energy levels and then charged again, the energy levels of the charged battery cells 10 may also be different from one another. If the charge and discharge are repeated several times in this state, some of the battery cells 10 may be overdischarged, and therefore, the potential to be used becomes 0V or less. If a user continuously discharges or uses the battery cells 10, there may occur a phenomenon in which the potentials of the battery cells 10 are changed.

In a case where the battery cells 10 with different energy levels are charged in the state that they are connected in series to one another, the battery cells 10 with relatively high energy levels transfer a charge completion signal to a charger before the battery cells 10 with low energy levels. Accordingly, the charger completes the charge of the battery cells 10. Further, before the overdischarged battery cells 10 approach a complete charge state, the other battery cells 10 approach an overdischarge state. That is, some of the plurality of battery cells 10 repeat incomplete charge-overdischarge or battery reversal, and the other battery cells 10 repeat complete charge or overcharge-incomplete discharge. As a result, the battery cells 10 may be damaged.

Therefore, in an embodiment of the present invention, the large-capacity battery pack may provided with the BCU 200 for managing the state of each of the battery cells 10 so as to reduce damage of the battery cells 10. The main-relays 30 and 40 and the sub-relays 20, which are used to cut off current in the failure of the battery pack, may be connected to the BCU 200. The plurality of sensors 50a, 50b, 50c, 60, 70a, and 70b, which are used to transfer signals to the BCU 200 in the failure of the battery cells 10, may be connected to the BCU 200.

Hereinafter, a housing 110, 120, 130, and 140 of the battery module 100 will be described.

The housing 110, 120, 130, and 140 may include a pair of end plates 110 and 120 respectively disposed at outer ends of the plurality of battery cells 10, and connection members 130 and 140 connecting the pair of end plates 110 and 120 to each other.

In one embodiment, the plurality of battery cells 10 may be aligned in one direction within a space defined by the pair of the end plates 110 and 120 and the connection members 130 and 140 that connect the pair of the end plates 110 and 120 to each other. The plurality of battery cells 10 may be aligned in parallel to one another so that their wide front surfaces are opposite to one another.

The connection members 130 and 140 may include side brackets 130 that support both side surfaces of the battery cells 10 and a bottom bracket 140 that supports bottom surfaces of the battery cells 10. One end of each of the brackets 130 and 140 is fastened to one end plate 110, and the other end of each of the brackets 130 and 140 is fastened to the other end plate 120. In one embodiment, the pair of the end plates 110 and 120, the side brackets 130 and the bottom bracket 140 may be fastened together by fastening members such as bolts, nuts, and the like.

The pair of end plates 110 and 120 are disposed to come in surface contact with outermost battery cells 10, respectively, so as to pressurize the plurality of battery cells 10 to the inside of the plurality of battery cells 10. In one embodiment, the positive and negative electrode terminals 11 and 12 of the plurality of battery cells 10 supported by the pair of the end plates 110 and 120, the side brackets 130 and the bottom bracket 140 may be alternately positioned such that the plurality of battery cells 10 may be connected in series to one another.

The housing 110, 120, 130, and 140 is formed to stably fix the plurality of battery cells 10. However, the housing of the present invention is not limited to the shape described above. That is, the housing may be variously modified and implemented. Further, the connection structure and the number of the battery cells 10 may be variously modified according to the design of the battery pack.

Figure 2:
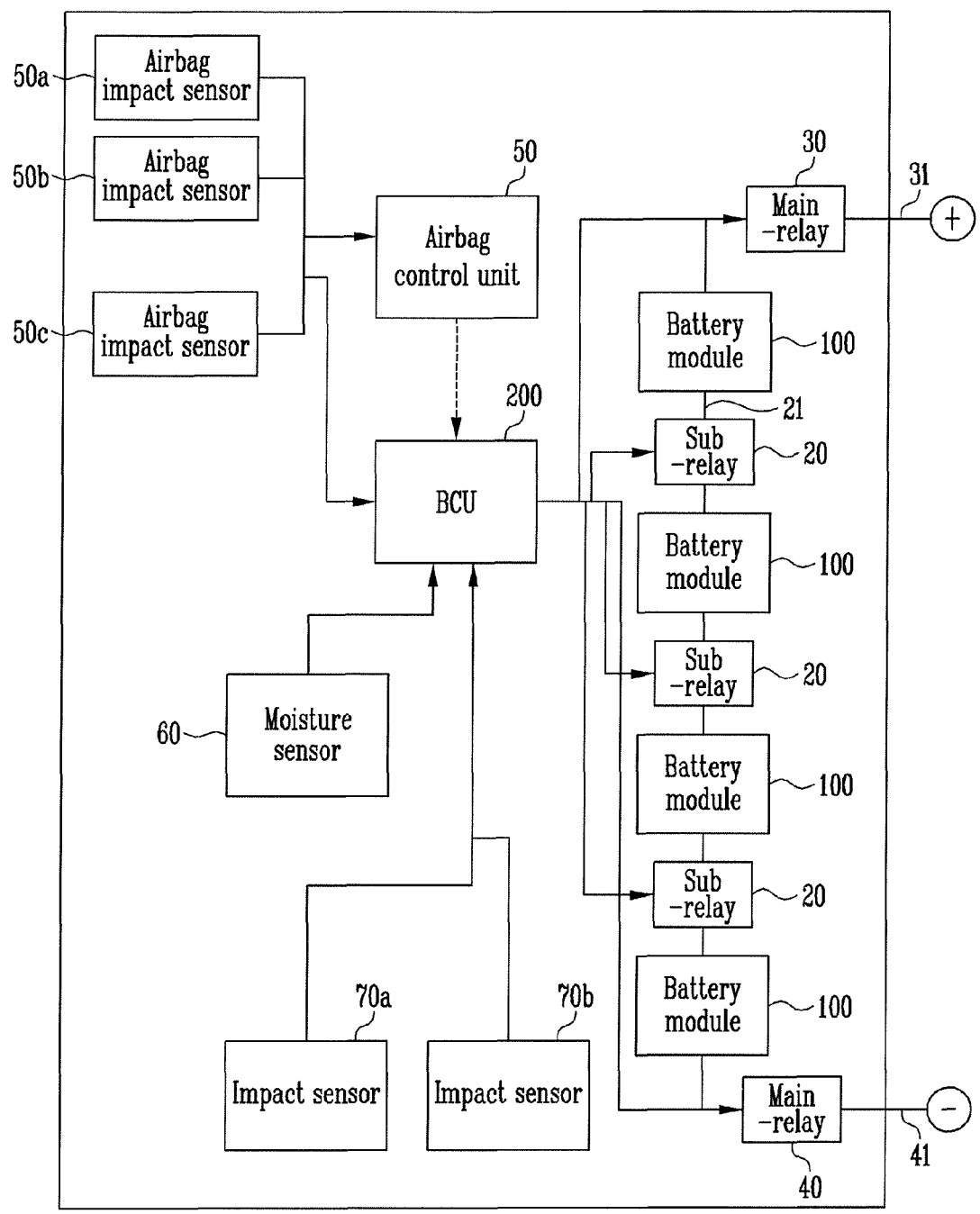
FIG. 2 is a schematic block diagram of a battery pack according to an embodiment of the present invention.

FIG. 2 is a schematic block diagram of a battery pack according to an embodiment of the present invention.

Referring to FIG. 2, the battery pack according to one embodiment includes the battery modules 100, the positive electrode main-relay 30, the negative electrode main-relay 40, and the sub-relays 20.

The battery modules 100 include a plurality of battery cells 10 (see FIG. 1), and a plurality of battery modules 100 (e.g., four) constitute the battery pack. The positive and negative electrode relays 30 and 40 are connected to the output lines 31 and 41 of the battery modules 100, respectively. The sub-relays 20 are connected to the connection lines 21 between the neighboring battery modules 100.

The positive electrode main-relay 30, the negative electrode main-relay 40, and the sub-relays 20 are electrically connected to the BCU 200. The BCU 200, in one embodiment, is electrically connected to the airbag impact sensors 50a, 50b, and 50c, the moisture sensor 60, and the impact sensors 70a and 70b.

In one embodiment, a signal outputted from the airbag impact sensors 50a, 50b, and 50c may be simultaneously transferred to the BCU 200 and the airbag control unit 50. Accordingly, if a signal is outputted from the airbag impact sensors 50a, 50b, and 50c, an airbag is operated, and it is possible to cut off electrical connection between the battery modules 100. Alternatively, the signal outputted from the airbag impact sensors 50a, 50b, and 50c may be transferred to the BCU 200 through the airbag control unit 50.

Through the connection structure described above, the BCU 200 can control the positive electrode main-relay 30, the negative electrode main-relay 40, and the sub-relays 20 in response to a signal outputted from the plurality of sensors 50a, 50b, 50c, 60, 70a, and 70b. That is, the BCU 200 can cut off the electrical connection between the battery modules 100 by transferring a signal outputted from each of the sensors 50a, 50b, 50c, 60, 70a, and 70b to the sub-relays 20. In addition, the BCU 200 can cut off power of the battery pack itself by transferring the signal outputted from each of the sensors 50a, 50b, 50c, 60, 70a, and 70b to the positive and negative electrode main-relays 30 and 40.

If all the sub-relays 20 between the battery modules 100 are operated, all the connection lines 21 between the battery modules 100 are cut off, and therefore, the voltage of the battery pack may be decreased to one half of the voltage of the battery pack in the normal operation of all the battery modules 100. Accordingly, in a case where the insulation of the battery pack is broken due to impact or water intrusion, the output voltage of the battery pack is decreased to the voltage level of any one battery module 100, so that the risk of fire, electric shock, or the like can be reduced, thereby improving safety of the battery pack.

In a case where a signal is outputted from the sensors 50a, 50b, 50c, 60, 70a, and 70b, the power of the battery pack may be cut off by operating the main-relays 30 and 40. The positive electrode main-relay 30, the negative electrode main-relay 40, and the sub-relays 20 may be controlled to operate simultaneously or individually.

Figure 3:
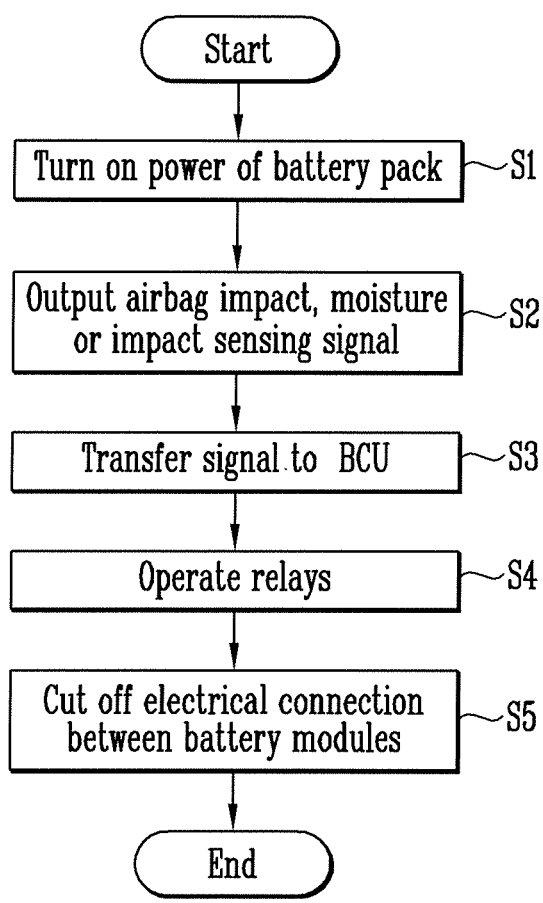
FIG. 3 is a flowchart illustrating an operation of a battery pack according to an embodiment of the present invention.

FIG. 3 is a flowchart illustrating an operation of a battery pack according to an embodiment of the present invention.

Referring to FIG. 3, the power of the battery pack is turned on (S1).

Then, the airbag impact sensors 50a, 50b, and 50c, the moisture sensor 60, and the impact sensors 70a and 70b, which are connected to the BCU 200, are operated. If impact or moisture is not sensed, the sensors 50a, 50b, 50c, 60, 70a, and 70b do not output a signal. If damage of the battery pack, i.e. impact or moisture, is sensed, the sensed signal is transferred to the BCU 200. In this instance, one or more of the sensors 50a, 50b, 50c, 60, 70a, and 70b output a signal (S2).

The outputted signal is transferred to the BCU 200 (S3). Subsequently, the BCU 200 transfers the signal to the sub-relays 20 to operate the sub-relays 20 (S4). Accordingly, each of the sub-relays 20 is operated to cut off electrical connection between the battery modules 100 (S5).

The sub-relays 20 are connected to the connection lines 21 that connect between the battery modules 100, so that the signal outputted from the sensors 50a, 50b, 50c, 60, 70a, and 70b can be transferred to each of the sub-relays 20 through the BCU 200. Thus, if necessary, the current that flows between the battery modules 100 is cut off, so that it is possible to decrease the voltage of the battery pack. That is, in a case where the insulation of the battery pack is broken, for example, the electrical connection between the battery modules 100 is cut off, so that it is possible to reduce the risk due to electric shock.

Figure 4:
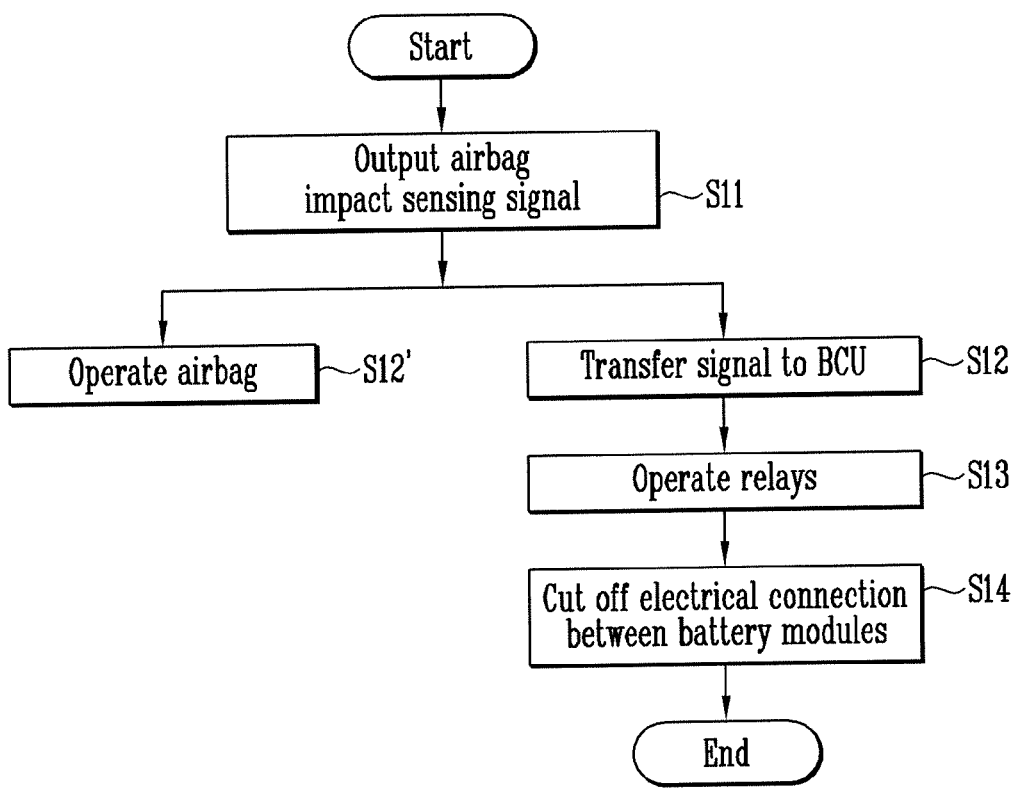
FIG. 4 is a flowchart illustrating an operation of a battery pack according to another embodiment of the present invention.

FIG. 4 is a flowchart illustrating an operation of a battery pack according to another embodiment of the present invention.

Referring to FIG. 4, if impact is sensed by the airbag impact sensors 50a, 50b, and 50c, the airbag impact sensors 50a, 50b, and 50c output a signal (S11). The outputted signal may be simultaneously transferred to the airbag control unit 50 and to the BCU 200 (S12). The signal transferred to the airbag control unit 50 enables an airbag to be operated (S12').

The signal transferred to the BCU 200 is transferred to the sub-relays 20 to be operated (S13). In a case where the signal outputted from the airbag impact sensors 50a, 50b, and 50c is transferred to the sub-relays 20 through the BCU 200, the sub-relays 20 may be operated to cut off the electrical connection between the battery modules 100 (S14).

Accordingly, in a case where the insulation of the battery pack is broken due to impact or water intrusion, the output voltage of the battery pack is decreased to the voltage level of any one battery module, so that the risk of fire, electric shock, or the like can be reduced, thereby improving safety of the battery pack.

Figure 5:
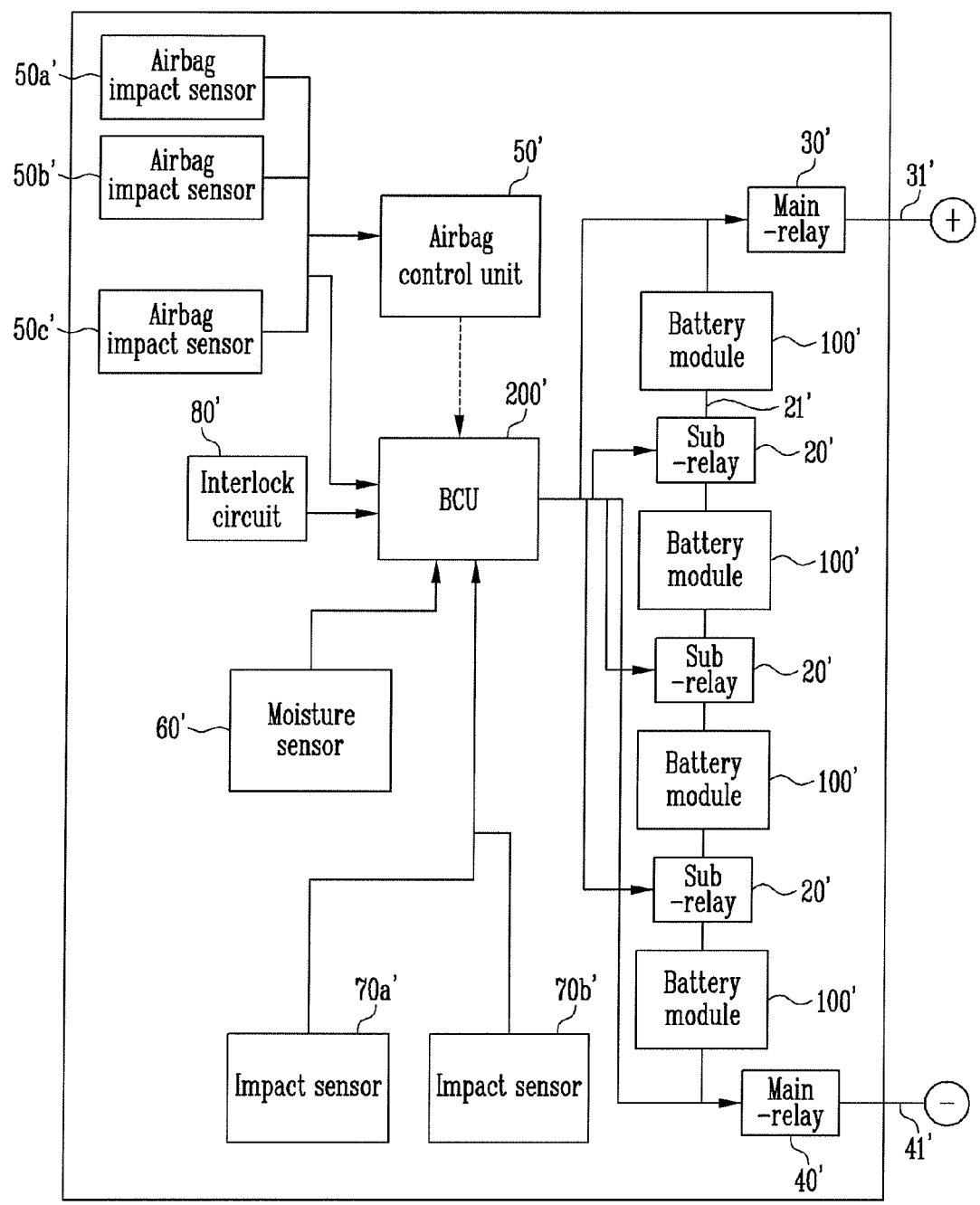
FIG. 5 is a schematic block diagram of a battery pack according to another embodiment of the present invention.

FIG. 5 is a schematic block diagram of a battery pack according to another embodiment of the present invention.

Referring to FIG. 5, a battery pack according to one embodiment may further include an interlock circuit 80'. In the following description of the battery pack illustrated in FIG. 5, description of components described above in the aforementioned embodiments will not be repeated.

In an embodiment of a battery pack in which one of two or more circuits is operated, the interlock circuit 80' allows another circuit not to be operated even though an input is applied to the another circuit. Accordingly, the battery pack having the interlock circuit 80' connected thereto can selectively control sub-relays 20' during repair of the battery pack. That is, in the repair of the battery pack, the sub-relays 20' are operated without the signal of a BCU 200', so that it is possible to selectively cut off power between battery modules 100'.

In the aforementioned embodiments of the present invention, the battery pack having a serial connection structure has been described as an example. However, the present invention is not limited thereto, and it will be apparent to those skilled in the art that the present invention can be applied to battery packs having a parallel connection structure.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack comprising:
    a plurality of battery modules, each respective battery module of the plurality of battery modules including a plurality of battery cells connected to one another between first and second terminals of the respective battery module;
    a plurality of relays comprising main-relays connected to output lines of the plurality of battery modules and a plurality of sub-relays each connected to a respective connection line between a respective pair of battery modules of the plurality of battery modules, the output lines each being connected to a terminal of the first and second terminals of a battery module at a respective end of the plurality of battery modules, each of the connection lines connecting between the first terminal of a first battery module of the respective pair of battery modules and the second terminal of a second battery module of the respective pair of battery modules;
    a battery control unit connected to the plurality of relays for controlling the plurality of battery cells; and
    at least one sensor connected to the battery control unit and configured to output a signal to the battery control unit,
    wherein the battery control unit is configured to control the plurality of relays in response to the signal outputted from the at least one sensor,
    wherein when the plurality of sub-relays receives a signal from the battery control unit, each of the plurality of sub-relays cuts off electrical connection between the respective pair of battery modules,
    wherein the at least one sensor comprises at least one of an airbag impact sensor, a moisture sensor, or an impact sensor, and
    wherein the main-relays and the plurality of sub-relays are operable simultaneously in response to the signal outputted from the at least one sensor.

2. The battery pack according to claim 1, further comprising an airbag control unit connected between the airbag impact sensor and the battery control unit.

3. The battery pack according to claim 2, wherein a signal outputted from the airbag impact sensor is simultaneously transferred to the battery control unit and the airbag control unit.

4. The battery pack according to claim 2, wherein the signal outputted from the airbag impact sensor is transferred to the battery control unit through the airbag control unit.

5. The battery pack according to claim 1, wherein the main-relays and the at least one sub-relay are operable individually in response to the signal outputted from the at least one sensor.

6. The battery pack according to claim 1, further comprising an interlock circuit connected to the battery control unit, the interlock circuit being configured to selectively control the relays for repairing the battery pack.

7. The battery pack according to claim 1, wherein the battery control unit is configured to control the plurality of sub-relays to cut off electrical connection between each of the respective pairs of battery modules in response to the signal outputted from the at least one sensor.

* * * * *